US006225768B1

(12) United States Patent
Cookson et al.

(10) Patent No.: US 6,225,768 B1
(45) Date of Patent: May 1, 2001

(54) AUTOMATIC DOOR SAFETY SYSTEM WITH MULTIPLE SAFETY MODES

(75) Inventors: James H. Cookson, Gastonia, NC (US); Bryon Hibbetts, Peoria, AZ (US)

(73) Assignee: The Cookson Company, Phoenix, AZ (US)

( * ) Notice: Subject to any disclaimer, the term of this patent is extended or adjusted under 35 U.S.C. 154(b) by 0 days.

(21) Appl. No.: 09/372,900

(22) Filed: Aug. 12, 1999

Related U.S. Application Data

(60) Provisional application No. 60/096,216, filed on Aug. 12, 1998.

(51) Int. Cl.[7] ........................ H02P 1/00

(52) U.S. Cl. ........................ 318/280; 318/466; 49/28

(58) Field of Search ........................ 318/264–266, 318/280, 282, 283, 286, 466, 467, 468, 480; 49/28, 26; 187/316, 317

(56) References Cited

U.S. PATENT DOCUMENTS

| | | | | |
|---|---|---|---|---|
| 4,048,630 | * | 9/1977 | Deming et al. | 340/274 R |
| 4,328,540 | * | 5/1982 | Matsuoka et al. | 364/167 |
| 4,475,069 | * | 10/1984 | Tadokoro et al. | 318/265 |
| 4,683,975 | * | 8/1987 | Booth et al. | 180/289 |
| 4,976,168 | * | 12/1990 | Lotznicker et al. | 74/625 |
| 5,039,925 | * | 8/1991 | Schap | 318/282 |
| 5,285,136 | * | 2/1994 | Duhame | 318/266 |
| 5,357,183 | * | 10/1994 | Lin | 318/468 |
| 5,384,495 | * | 1/1995 | Waggamon et al. | 307/326 |
| 5,412,297 | * | 5/1995 | Clark et al. | 318/468 |
| 5,701,063 | * | 12/1997 | Cook et al. | 318/469 |
| 5,878,530 | * | 3/1999 | Eccleston et al. | 49/139 |
| 5,994,858 | * | 11/1999 | Miura | 318/283 |

* cited by examiner

*Primary Examiner*—Jeffrey Donels
*Assistant Examiner*—Rina I. Duda
(74) *Attorney, Agent, or Firm*—Snell & Wilmer L.L.P.

(57) ABSTRACT

An automatic door diagnostic system for operating a door and a door motor which detects and reacts to various hazard conditions. According to one embodiment of the present invention, a sensor is used to detect hazard conditions and communicates with a controller which operates a motor for opening and/or closing the door. The controller then operates according to various protocols to open, close, stop and/or reverse the direction of the door. Additionally, according to various alternative aspects of the present invention, the automatic door diagnostic system can be configured to perform diagnostic checks to ensure proper operation of the components of the system.

16 Claims, 5 Drawing Sheets

AUTOMATIC DOOR SAFETY SYSTEM WITH MULTIPLE SAFETY MODES

CROSS-REFERENCE TO RELATED APPLICATIONS

This application claims the benefit of U.S. Provisional Application Serial No. 60/096,216, filed Aug. 12, 1998.

BACKGROUND OF THE INVENTION

1. Technical Field

The present invention relates generally to door systems, and more particularly to automatic door safety systems for detecting hazard conditions and operating accordingly.

2. Background of the Invention

Automatic doors and door systems are becoming increasingly popular in both commercial and residential settings. Such door systems typically comprise the door and a motor which opens and closes the door when a switch is activated. In addition, the systems often include additional devices and features which contribute to the utility of the systems. For example, home garage doors or warehouse access doors often have transmitter and receiver buttons which allow the doors to be opened remotely. Other door systems may have sensors which automatically close or open doors for safety reasons. For example, in case of a fire, a sensor may cause a fire-resistant door to close, cutting off the air supply to a fire or preventing the fire from spreading to other areas.

Conventional systems are not, however, without drawbacks. For example, as the doors close, many existing systems do not provide adequate mechanisms for causing the door to react should an object obstruct the path of the door. For example, when a car or an animal moves into the door's path, the door systems do not sense these conditions, and the door continues to close, causing damage or injury.

In attempts to prevent injury or damage, some door systems may have safety devices which cause the door to stop when the door contacts an obstruction. For example, some door systems may have resistance sensors which stop the motor if the door encounters resistance before reaching a predetermined point, for example, the floor. Such safety devices, however, are less than ideal. Generally, these devices only stop the door after the door contacts the obstruction. In some cases this may be too late to prevent damage. For example, if a door comes down on a vehicle, damage may have already been done. The paint may be scratched and, if the door is not stopped soon enough, the downward pressure of the door may dent the hood. Similarly, the downward force could injure animals or people.

Further, if safety measures are included to detect obstructions and other hazards, the safety measures are, like any electromechanical system, subject to potential failures. To prevent damage or injury, the safety devices should be operating properly to identify potential problems and take the appropriate action. For example, if a hazard sensing device is not functioning properly, the door continues to close, regardless of whether an obstruction is encountered, potentially causing damage or injury.

SUMMARY OF THE INVENTION

The present invention provides an automatic door control system for operating a door which detects and causes the door to react to hazard conditions. In an exemplary embodiment of the present invention, a controller which operates the motor communicates with a sensor which detects the hazard condition. When the hazard condition is detected, the sensor generates a hazard signal, and the hazard signal is communicated to the controller. The controller then operates according to a selected protocol to open, close, stop or reverse the direction of the door. Additionally, according to various alternative aspects of the present invention, the system can be configured to perform diagnostic checks to ensure proper operation of the components of the system.

DESCRIPTION OF THE DRAWING

Additional aspects of the present invention will become evident upon reviewing the non-limiting embodiments described in the specification and the claims taken in conjunction with the accompanying figures, wherein like numerals designate like elements, and:

DESCRIPTION OF THE PREFERRED EXEMPLARY EMBODIMENT

The following descriptions are of preferred exemplary embodiments of an automatic door safety system only, and are not intended to limit the scope, applicability, or configuration of the invention in any way. Rather, the following description merely provides a convenient illustration for implementing a preferred embodiment of the invention. For example, various changes may be made to the function and arrangement of elements described in the preferred embodiments without departing from the spirit and scope of the invention as set forth in the appended claims.

Figure 1:
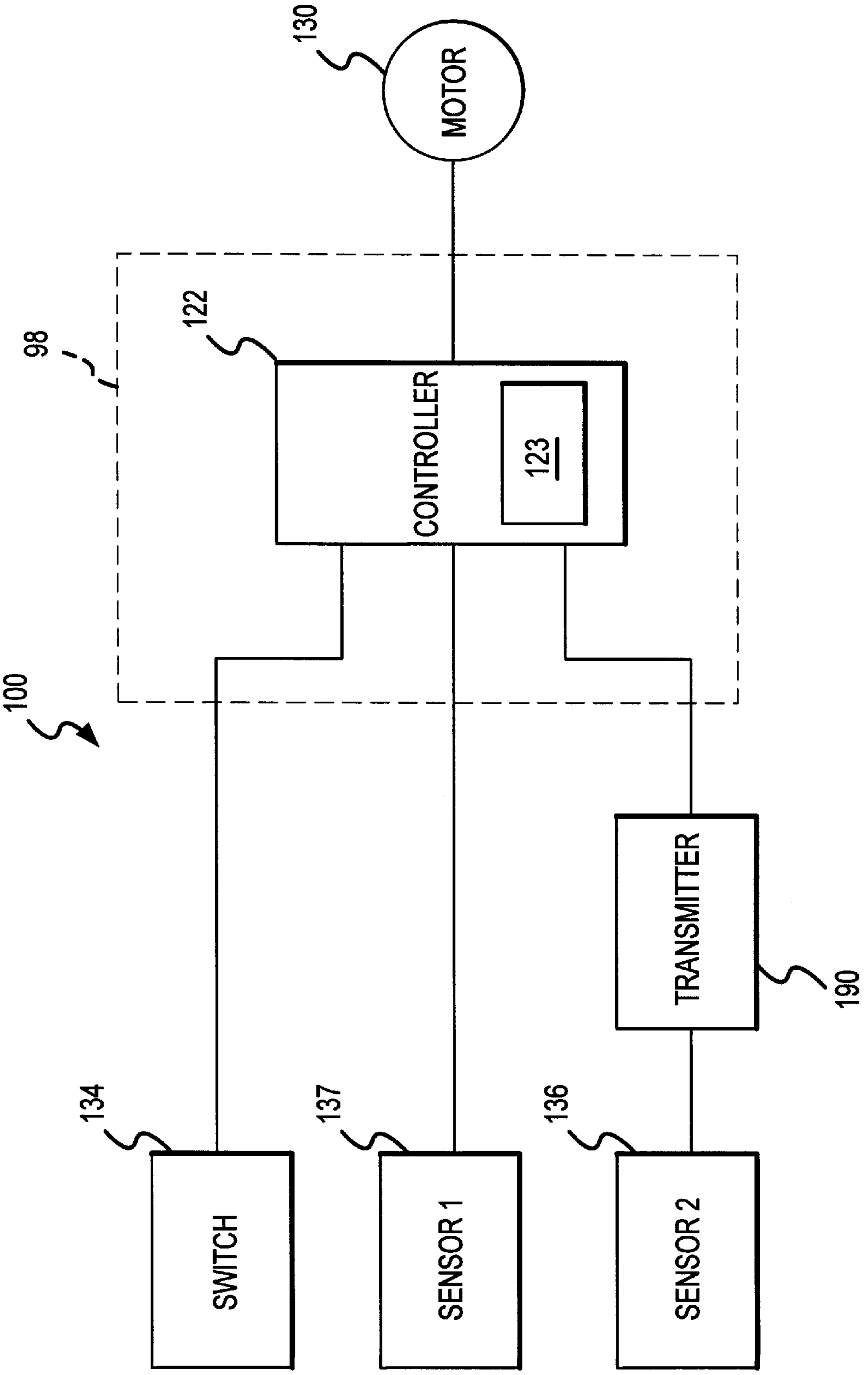
FIG. 1 is a schematic drawing of an exemplary embodiment of an automatic door safety system of the present invention.

Referring now to FIG. 1, a schematic drawing of an automatic door safety system 100 according to various aspects of the present invention comprises a motor 130; a control switch 134; and an automatic door control system 98. In the present embodiment, the door control system 98 includes a controller 122 for controlling the operation of the motor 130 and at least one sensor 136, 137. The motor 130 suitably controls the operation of the door (not shown), such as a vertically moving rolling door for a truck loading bay. The automatic door system 100 may suitably be adapted, however, to any appropriate kind of door, such as a swinging overhead door, a side rolling door, or a sliding door. The motor 130 may comprise any suitable apparatus for moving the door, for example an electric induction motor, an electric DC motor, or any other appropriate motor. In an exemplary embodiment, the motor 130 may be a unit manufactured by Link-Liftmaster, model GH, using industry standard B2 type wiring.

The control switch 134 suitably facilitates the main operation of the door. In the present exemplary embodiment, the control switch 134 comprises a conventional manual switch, such as a normally-open membrane button switch, which may be depressed to initiate closure or retraction of the door. The control switch 134 of the present exemplary embodiment may be depressed and released to generate a single signal, or depressed and held to generate a continuous signal. The control switch 134 may comprise any suitable switch for operation of the door, including a manual switch, a switch linked to a timer of an automatic operator, or other automatic switching mechanism. Further, the control switch 134 may comprise multiple switches or buttons for providing different control signals to the door control system 98, such as a CLOSE button, an OPEN button, and a STOP button. The control switch 134 may communicate with the other components of the automatic door system 100 in any suitable manner, for example by analog or digital signals transmitted via wire, acoustic signals, electromagnetic signals such as RF or infrared signals, fiber optics, and the like, to facilitate an operative connection between the control switch 134 and the other components, such as the door control system 98.

The operation of the motor 130 is controlled by the door control system 98. In the present exemplary embodiment, for example, the controller 122 controls the motor 130 according to various input signals, such as signals received from the control switch 134 and the sensors 136, 137. The door control system 98 may control the motor 130 based on any suitable criteria and/or input conditions. In the present embodiment, the controller 122 of the door control system 98 suitably comprises a conventional hardwired controller for operating the motor 130 to close and retract the door according to signals from the control switch 134, the sensors 136, 137 and a selected operation protocol. The controller 122 may comprise any suitable controller, however, for controlling the motor 130 according to the signals from the various input signals, including a microprocessor-based system, an analog signal system, or any other appropriate controller.

The sensors 136, 137 comprise mechanisms for sensing conditions potentially affecting the desired operation of the motor 130 and the door. For example, the sensors 136, 137 may be configured to sense hazard conditions such as obstructions to the door and/or other conditions under which the door should be activated, stopped, or reversed. The type and number of sensors 136, 137 may be selected or configured according to the particular relevant conditions to be sensed and the application of the door. For example, the sensors may include an opto-electronic sensor 137 positioned near the door to detect an obstruction in the path of the door that would damage the door or suffer damage or injury if struck by the door. If such an obstruction is detected, the opto-electronic sensor 137 provides a signal to the controller 122. The controller 122 then suitably adjusts the operation of the motor 130 according to the selected operation protocol, for example to retract the door back to a starting position.

The sensors 136, 137 are suitably connected to the controller 122 in any suitable manner, such as hard wiring, fiber optics, RF signals, acoustic signals, and infrared signals. For a stationary sensor such as the opto-electronic sensor 137, a hard wire connection may be used for reliability and simplicity. For other sensors, wireless communications may be used. For example, in an exemplary embodiment, one of the sensors 136, 137 suitably communicates with the controller 122 by RF signals. Wireless communication may be especially suited to sensors which move with the door, such as a pneumatic sensor attached to the leading edge of a door.

The sensors further suitably include a second sensor 136, for example, for sensing other potentially hazardous conditions or operating as a redundant sensor to the first sensor 137. In the present embodiment, the second sensor 136 suitably comprises a sensor for sensing obstructions by contact, such as a conventional pneumatic strip, or an electrical contact strip sensor attached to the leading edge of the advancing door. If a pneumatic strip encounters an object, the strip compresses, generating increased air pressure within the strip. When the increased pressure exceeds a threshold, a signal is generated and transmitted to the controller 122. Similarly, if an electrical contact strip encounters an object, the strip compresses such that two opposing electrical contacts touch, generating an electric signal. The controller 122 then adjusts the operation of the motor 130 according to the operation protocol, for example by reversing the direction of movement of the door or stopping the door.

The second sensor 136 may communicate with the controller 122 in any suitable manner. For example, the second sensor 136 may be connected to the controller 122 via a wire extending from the second sensor 136 to the controller 122. In the present embodiment, however, the second sensor 136 operates in conjunction with a transmitter/receiver 190, such as a RF transmitter/receiver, for transmitting and receiving signals to and from the controller 122. Thus, for example, if a hazard condition such as an obstruction is detected by the second sensor 136, the second sensor 136 transmits a signal to the controller 122, which then adjusts the operation of the motor 130 accordingly.

The door control system 98 is also suitably equipped with a diagnostic system 123 to ensure proper operation of various components, such as the second sensor 136. Although the diagnostic system 123 is shown in FIG. 1 as being part of the controller 122, the diagnostic system may be configured as a separate component or integrated into one or more other systems, such as the sensors 136, 137 and/or the controller 122. Further, the diagnostic system 123 may be of any appropriate exhaustiveness or simplicity. For example, the diagnostic system 123 may merely check the second sensor's 136 power source, such as a battery, to determine whether sufficient power is provided for operation. More complex diagnostic versions may test other functions, such as the communications link between the second sensor 136 and the controller 122, the functionality of the sensors 136, 137, the functionality of the controller 122, the operating conditions of the motor 130, and the like, and may be implemented in any manner, such as in conjunction with a processor or a dedicated hardwired system. The diagnostic system 123 may also be configured to transmit the results of the diagnostic check to the user, the controller 122, or other suitable component. For example, the diagnostic system 123 may activate a warning, such as a warning light or an alarm (not shown).

The diagnostic system may be configured to operate at all times or, alternatively, to perform a diagnostic sequence upon selected events. For example, in the present exemplary embodiment, the diagnostic system 123 includes a floor sensor associated with the second sensor 136 and performs a diagnostic check upon activation of the floor sensor. The diagnostic check may be performed at any number of times, however, including, but not limited to, each time the door closes, each time the door opens, at an intermediate door position, or throughout door motion. The floor sensor may comprise any suitable mechanism for sensing the closure position of the door, such as sensor associated with the motor 130 to detect the door position based on the operation of the motor 130. Alternatively, the floor sensor may comprise a pneumatic or electrical sensor at the bottom of the door or a button extending below the bottom of the door such that when the door is completely closed, the button engages the floor and is depressed. In the present embodiment, activation of the floor sensor initiates the diagnostic check. The diagnostic system 123 sends an OK signal to the controller 122 if the diagnostic system 123 detects no problems. If problems are detected, the OK signal is not sent.

As described in additional detail below, the door safety system 100 may be configured to suitably adjust the operation of the door according to the results of the diagnostic process, for example to require the operator's presence to close the door if the door safety system 100 is not functioning properly, such as due to failure of one of the sensors. In the present exemplary embodiment, the controller 122 operates in one of at least two modes, for example, a NORMAL mode and a SUPERVISED mode. In the NORMAL mode, a single pulse from the control switch 134 reverses the direction of the door. Thus, if the door is opening or fully open, a single pulse from the control switch 134 causes the door to close. In the SUPERVISED mode, the door closes only as long as a continuous signal is received from the control switch 134, such as when pressure is continuously applied to the control switch 134. In either mode, the door may open with a single pulse from the control switch 134. Consequently, when the controller 122 is in NORMAL mode, the operator may briefly activate the control switch 134 to initiate closure of the door, and the door continues to close without further intervention from the operator. In SUPERVISED mode, on the other hand, the operator maintains pressure on the control switch 134 until the door is completely closed. If the control switch 134 is released, the signal termninates, and the door stops until the control switch 134 is activated again.

The mode of operation of the controller 122 is suitably affected by the signal received from the diagnostic system 123. In the present embodiment, the controller 122 typically operates in NORMAL mode and remains in NORMAL mode as long as the diagnostic system 123 indicates that the door safety system 100 is functioning properly. For example, when the door closes, the diagnostic system 123 performs the diagnostic process and, if the relevant systems are operating, transmits the OK signal to the controller 122. If the relevant systems are not operating, for example due to loss of power from a battery, the diagnostic system 123 does not transmit the OK signal.

If the OK signal is received by the controller 122, the controller 122 remains in NORMAL mode. If the OK signal is not received by the controller 122, the controller 122 switches to SUPERVISED mode. The controller 122 suitably remains in SUPERVISED mode until the OK signal is received. For example, if expired batteries in the second sensor 136 are replaced following entry into the SUPERVISED mode, the diagnostic system 123 transmits the OK signal, assuming all other functions are operating, upon the next closure of the door in SUPERVISED mode and successful performance of the diagnostic process. The controller 122 then suitably returns to NORMAL mode.

As briefly described above, in operation, the door system 100 may function in accordance with signals from the sensors and the control switch 134 and any other conditions as may be appropriate. According to one aspect of the present embodiment, the door automatically opens with a single, momentary activation of the control switch 134, and maintenance of pressure on the control switch 134 is not necessary. Closing the door, however, operates in conjunction with the sensors and according to the mode of operation. For example, the door may start closing and continue to close as long as no hazard conditions are detected by the sensors. If the sensors detect a hazard condition, the door suitably stops and/or reverses direction.

Figure 2A:
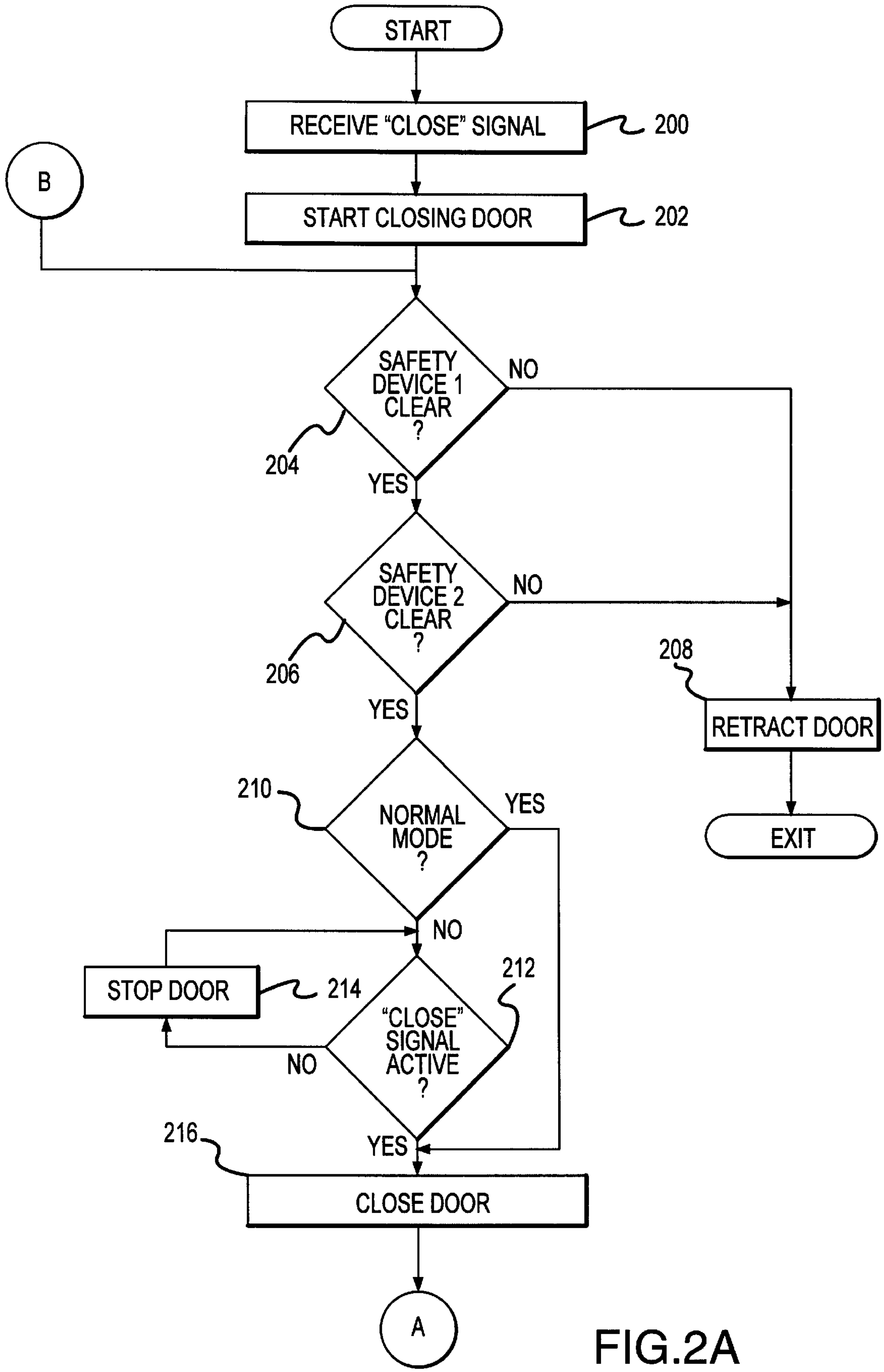
FIGS. 2A, B are block diagrams illustrating an exemplary sequence of the operating steps of an exemplary embodiment of an automatic door safety system of the present invention.
Figure 2B:
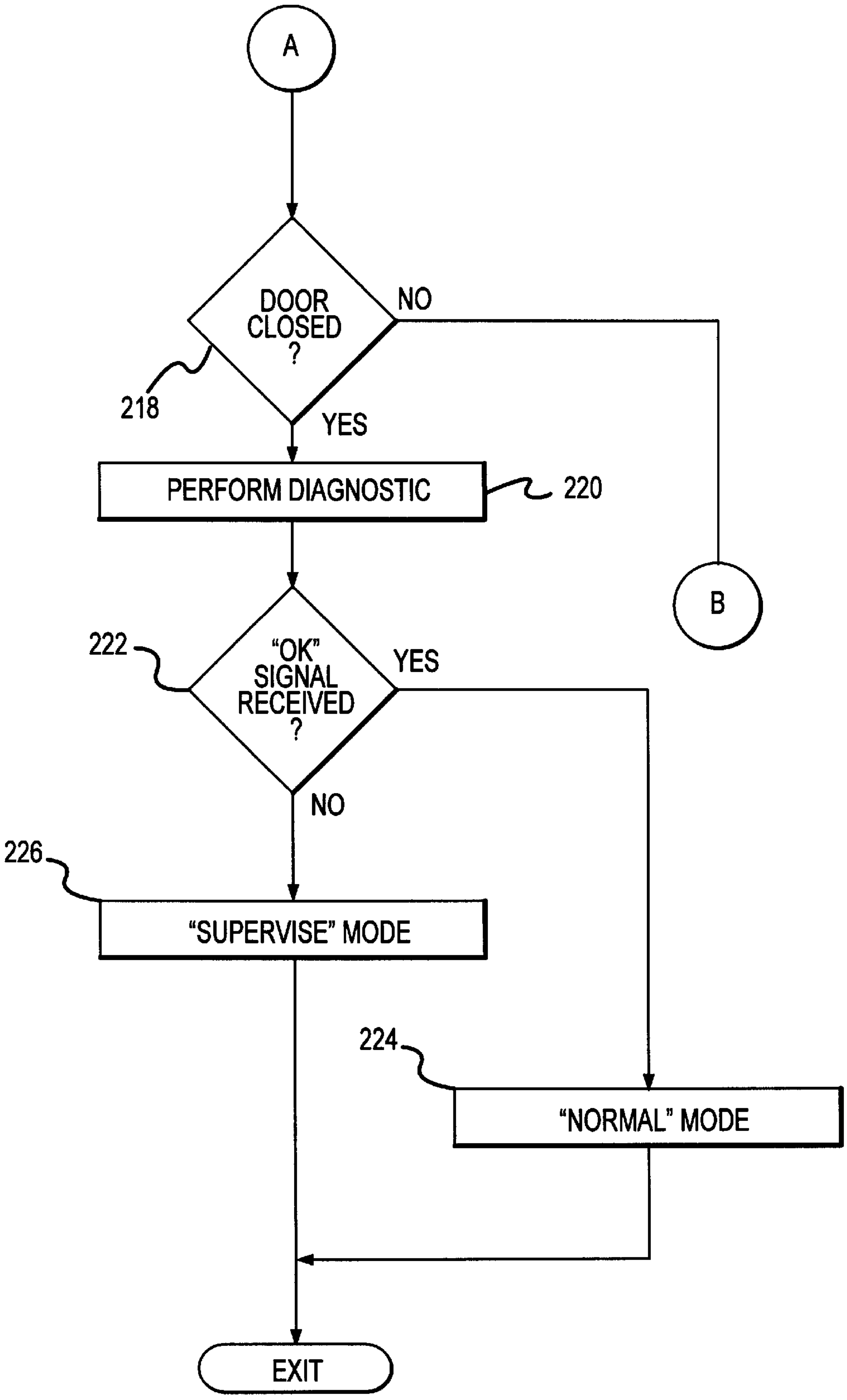

Referring now to FIGS. 2A–B, an exemplary sequence for closing the door comprises initially receiving a CLOSE signal from the control switch 134 (step 200) and starting to close the door (step 202). If none of the sensors 136, 137 indicates the presence of a hazard condition, the controller 122 continues to close the door (steps 204, 206). If any sensor indicates a hazard condition, the controller 122 can stop the door and/or reverse the direction of motion, thereby retracting the door (step 208).

If no hazard condition is detected, the controller 122 determines whether the current operative status is NORMAL mode or SUPERVISED mode (step 210). If the door is in SUPERVISED mode, the controller 122 determines whether the control switch 134 is still activated (step 212). If not, the door is stopped until the control switch 134 is reactivated (step 214). If the control switch 134 is continuously activated or in the NORMAL mode, the door starts and continues closing (step 216).

The controller 122 further determines whether the door is fully closed, for example by monitoring the displacement of the door or receiving a signal from a sensor, such as the second sensor 136 (step 218). If not, the door continues to close and repeats the process of monitoring the sensors 136, 137 and the control switch 134. If the door is closed, the second sensor 136 suitably performs the diagnostic process (step 220) and, if the diagnostic criteria are fulfilled, transmits the OK signal to the controller 122. As previously indicated, execution of the diagnostic process is not limited to the door closure, but may also be conducted when the door has reached the open position or at an intermediate position, or continually during door motion. In any event, if the controller 122 receives the OK signal following closure of the door (step 222), the controller 122 remains in or switches to NORMAL mode (step 224). If the OK signal is not received, the controller 122 switches to SUPERVISED mode (step 226).

Figure 3:
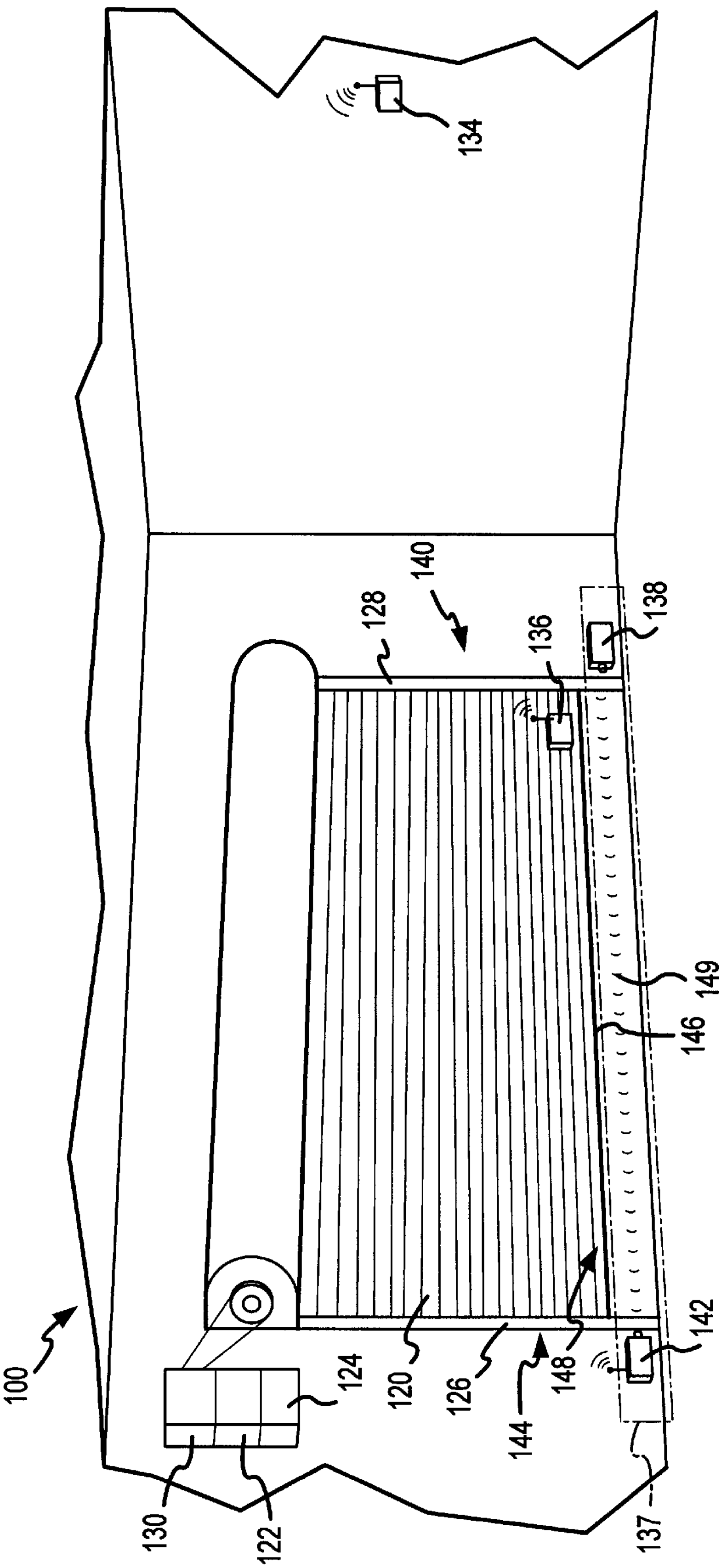
FIG. 3 is a perspective view of an exemplary embodiment of an automatic door safety system of the present invention.

A perspective view of an exemplary automatic door system 300 according to various aspects of the present invention is shown in FIG. 3. The system 300 includes a rolling door 120 (e.g., a door curtain), a door controller 122, and a diagnostic system 123 including an automatic safety control device 124. The rolling door 120 ascends and descends along a first rail 126 and a second rail 128 as a motor 130 drives a barrel (not shown) operatively connected to receive the door 120. The motor 130 is activated by the controller 122 when a normally open switch 134 is pressed by an operator, thereby providing a trigger signal to the controller 122 indicating that an open (i.e., raise door 120) or close (i.e., lower door 120) sequence is to be initiated. Once such a sequence is requested, the door 120 completed raises or lowers without further supervision unless a fault condition is detected by the automatic safety control device 124 or system error is detected.

Two hazard conditions of particular interest are the presence of an object in the path of the door 120 and a door 120 collision with an object. During a closing sequence, the door 120 may, for example, reverse direction and raise (i.e., retract) if an object (not shown) is in the path of the door 120 or an object is encountered by the door 120. To determine whether such a condition exists, sensors are included as an integral component of the system 300. In this illustrative description, multiple sensors are used by the system 300. Specifically, in the preferred embodiment, a pneumatic safety sensor 136, such as a PHANTOM FEATHER EDGE™, and an optical sensor 137 are used to identify door 120 contact with an object and/or an object in the path of the door 120, respectively.

The pneumatic safety sensor 136 is a sensor attached to a bottom 148 of the door 120 that detects increased pressure on the leading edge 146 of the door 120 that is produced by contact with an object. Alternatively, an obstruction may be independently or simultaneously identified by the optical sensor 137 that includes an optical transmitter 138 located at a first side 140 of the door 120 and an optical receiver 142 located at a second side 144 of the door 120. The optical transmitter 138 emits a beam 149 that is received by the optical receiver 142. In the event that an object comes between the optical transmitter 138 and the optical receiver 142, the beam 149 transmission is interrupted. In either event, a signal is produced by the air wave safety sensor 136 and/or the optical sensor 137 when an object is in the path of the door 120 or encountered by the door 120 while opening or closing. This signal is provided to the automatic safety control device 124 such that corrective action may be taken in response to the fault condition. As mentioned above, it should be noted that a wide variety of sensors are available for detection and the two sensors 136, 137 presented in this description are merely illustrative.

Figure 4:
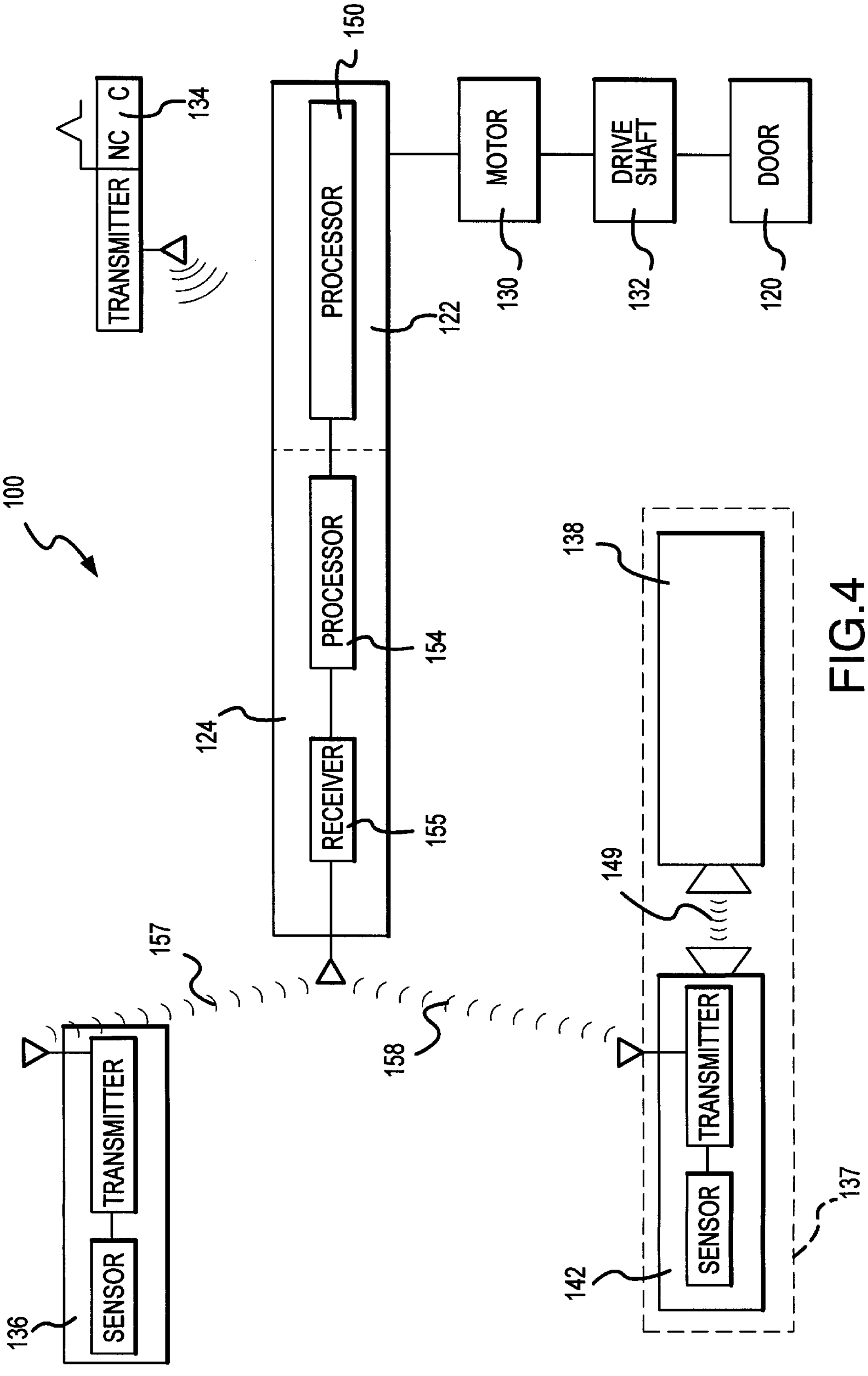
FIG. 4 is a schematic of an exemplary embodiment of an automatic door safety system of the present invention.

Referring to FIG. 4, a schematic of the automatic door system 100 is shown in further detail. According to one aspect of the present embodiment, the automatic safety control device 124 functions in conjunction with the door controller 122 to operate the motor 130 such that the door is properly raised or lowered. The door controller 122 has a processor 150 that provides the commands necessary to run the motor 130 based upon information provided by the safety control device 124. The information is generated by a processor 154 of the safety control device 124. The safety control device 124 uses signals received by a receiver 155 and produced by the pneumatic sensor 136 and/or optical sensor 137 which are transmitted via radio waves 157,158 and self diagnostic tests to place the processor 150 of the door controller 122 in a selected mode. For example, the processor 150 of the door controller 122 may be placed in a NORMAL mode, SUPERVISED mode, or RETRACTION mode.

In the NORMAL mode, the processor 150 of the controller 122 opens or closes the door 120 by providing an appropriate signal to the motor 130 based upon a momentary activation of the switch 134. Therefore, if the controller 122 is in the NORMAL mode, the door 120 continues to open or close without supervision by an operator and without further activation of the switch 134. The controller 122 remains in the NORMAL mode unless it is directed to initiate one of the two other operating procedures because of a hazard condition or system malfunction.

In the event that an object is identified by the optical sensor 137 and/or encountered by the pneumatic sensor 136 while the door is closing, the processor 154 of the safety control device 124 generates a hazard signal such that the processor 150 of the controller 122 enters the RETRACTION mode. Once in the RETRACTION mode, the processor 150 issues the appropriate commands to the motor 130 in order to stop the door or reverse the direction that the door is moving (i.e., the door is opened or retracted). This mode is maintained until the door is stopped or reaches a fully retracted position.

The SUPERVISED mode is suitably entered when the automatic safety control device 124 fails a diagnostic test that is conducted at predetermined times. For example, the diagnostic test may be conducted after each complete closing of the door, opening of the door, a specified intermediate door position, while the door is in motion or while the door is at rest. The diagnostic tests may include any number of hardware, software or communication protocols that tend to confirm the proper operation of the automatic safety control device 124, each sensor 136, 137 and their associated communication components (e.g., transmitters, receivers, etc.). As previously alluded, if each diagnostic test is successfully completed, the automatic safety control device 124 transmits an OK signal to the controller 122 directing a unsupervised operating mode. However, if any one of the diagnostic tests indicates a malfunction, the safety control device 124 withholds the OK signal indicating a FAILED condition to the controller 122, which causes the controller 122 to enter the SUPERVISED mode.

When the controller is in the SUPERVISED mode, momentary activation of the switch 134 does not result in motion of the door. Door movement occurs only while the switch 134 is pressed. In this manner, a manual override is provided so that the door may be only moved while under the continuous supervision by an operator who is applying continuous pressure to the switch 134. Therefore, while the door 120 may be closed or opened if the automatic safety control device 124 is ineffective, safety is maintained as operator assistance is required to complete the closing sequence. This mode of operation continues until such time as all diagnostic tests are successfully completed and the safety control device 124 transmits an OK signal to the controller 122 directing a return to the NORMAL mode of operation.

Thus, an automatic door system according to various aspects of the present invention operates in conjunction with multiple safety modes. Furthermore, the door system suitably includes a wireless safety system that utilizes radio transmitters and receivers, tending to improve the functionality, reliability, and aesthetics of the system. In addition, the door system may comprise a diagnostic system that, for example, suitably limits door movement to manual operation if a system malfunction is detected and retracts a closing door if an object is detected within the door path or an obstruction is encountered by the door.

While the principles of the invention have been described in illustrative embodiments, it should be apparent that many modifications of structure, arrangement, proportions, the elements, materials and components, used in the practice of the invention and not specifically described may be varied and particularly adapted for a specific applications and operating requirements, all without departing from those principles.

We claim:

1. An automatic door diagnostic system for operating a door, a switch and a motor, comprising:

a controller for operating said motor;

a sensor, for detecting a hazard condition, wherein said sensor generates a hazard signal when said sensor detects a hazard, wherein said hazard signal is one of a first mode and a second mode, and wherein said hazard signal is transmitted to said controller wherein when the switch is activated, said controller performs a diagnostic check to determine whether at least one of said sensor, a connection between said sensor and the switch, the switch, a connection between the switch and said controller, and said controller are functioning properly and if so, said sensor generates an OK signal, and wherein if any of said sensor, said connection between said sensor and the switch, the switch, the connection between the switch and said controller, and said controller are not functioning properly, the OK signal is not generated and said controller switches to a not OK mode.

2. An automatic door diagnostic system according to claim 1, wherein said diagnostic check is performed before the door moves.

3. An automatic door diagnostic system according to claim 1, wherein said controller performs a diagnostic check continuously during movement of the door.

4. An automatic door diagnostic system according to claim 1, wherein when the switch is activated while the door is open, said hazard signal switches to said second mode until said sensor determines there is no hazard.

5. An automatic door diagnostic system according to claim 4, wherein if said sensor detects a hazard said sensor remains in said second mode.

6. An automatic door diagnostic system according to claim 1, wherein when said sensor is in said second mode and the door is in an open position, a continuous signal is needed to close the door.

7. An automatic door diagnostic system according to claim 1, wherein said sensor is at least one of an optical sensor, a loop detector, a pressure sensor, a motion sensor, and a safety edge.

8. An automatic door diagnostic system according to claim 1, further comprising a second sensor for turning said first sensor off when the system is not in use.

9. An automatic door diagnostic system according to claim 8, wherein said second sensor is a switch.

10. A method for diagnosing an automatic door system and for operating a door and a motor, comprising the steps of:

providing a controller for operating said motor;

sensing whether a hazard condition is present;

generating a hazard signal according to whether a hazard condition is present;

communicating said hazard signal to said controller;

controlling the motor to open or close said door according to said communicated hazard signal; and determining whether at least one of a sensor, a connection between said sensor and a switch, said switch, a connection between said switch and a transmitter, and said transmitter are functioning properly, and wherein if any of said sensor, said connection between said sensor and said switch, said switch, said connection between said switch and said transmitter, and said transmitter are not functioning properly, said controller switches to a hazard mode.

11. A method for diagnosing an automatic door system according to claim 10, wherein said determining step is performed before said door moves.

12. A method for diagnosing an automatic door system according to claim 10, wherein said determining step is performed continuously during movement of the door.

13. A method for diagnosing an automatic door system according to claim 10, wherein said communicated hazard signal is one of a NORMAL mode and a SUPERVISED mode.

14. A method for diagnosing an automatic door system according to claim 10, wherein said communicating step is performed by at least one of a radio signal, infrared signal, and a wire.

15. A method for diagnosing an automatic door system according to claim 10, wherein said sensing step is performed by at least one of an optical sensor, a loop detector, a pressure sensor, a motion sensor, and a safety edge.

16. A method for diagnosing an automatic door system according to claim 10, further comprising a second sensing step for turning the diagnostic system off when the system is not in use.

* * * * *